United States Patent
Morishima

[11] Patent Number: 5,570,421
[45] Date of Patent: Oct. 29, 1996

[54] METHOD AND APPARATUS FOR CONTROLLING THE DRIVE FREQUENCY OF A LED

[75] Inventor: Masaaki Morishima, Tokyo, Japan

[73] Assignee: NEC Corporation, Tokyo, Japan

[21] Appl. No.: 279,794

[22] Filed: Jul. 25, 1994

[30] Foreign Application Priority Data

Jul. 23, 1993 [JP] Japan ................... 5-183109

[51] Int. Cl.⁶ ..................... H04M 1/00
[52] U.S. Cl. .............. 379/396; 379/56; 379/57; 379/63; 379/376; 379/96
[58] Field of Search ............... 379/396, 355, 379/96, 376, 56, 57, 63; 340/825.44; 345/63, 77, 82, 815.4, 815.45

[56] References Cited

U.S. PATENT DOCUMENTS

| | | | |
|---|---|---|---|
| 3,849,979 | 11/1974 | Tanji | 345/63 |
| 4,280,021 | 7/1981 | Yuan | 379/376 |
| 4,339,632 | 7/1982 | Early et al. | 379/355 |
| 4,379,210 | 4/1983 | Sparber | 379/376 |
| 4,726,060 | 2/1988 | Itoh et al. | 379/376 |
| 4,818,982 | 4/1989 | Kuehn et al. | 345/63 |
| 4,866,430 | 9/1989 | Chek | 345/82 |
| 4,951,311 | 8/1990 | Sterr | 379/376 |
| 4,953,205 | 8/1990 | Yang | 379/376 |
| 4,982,424 | 1/1991 | Saito et al. | 379/396 |
| 5,280,523 | 1/1994 | Lee | 379/376 |
| 5,315,695 | 5/1994 | Saito et al. | 345/77 |
| 5,327,486 | 7/1994 | Wolff et al. | 379/96 |
| 5,329,288 | 7/1994 | Kim | 345/63 |
| 5,384,832 | 1/1995 | Zimmerman et al. | 379/396 |
| 5,406,305 | 4/1995 | Shimomura et al. | 345/63 |

*Primary Examiner*—Krista M. Zele
*Assistant Examiner*—Scott Wolinsky
*Attorney, Agent, or Firm*—Sughrue, Mion, Zinn, Macpeak & Seas

[57] ABSTRACT

A drive frequency control method and apparatus for use in a radio receiver, such as a paging unit. The paging unit includes an LED for informing a user of an incoming call, and a drive frequency controller coupled to the LED for controlling the luminance of the LED by supplying a certain amount of electric current to the LED. The luminance of the LED is based on the amount of ambient light detected by an illumination detector. The detected illuminance information is sent to a CPU, which controls the drive frequency generator accordingly. The drive frequency generator generates a drive signal which is provided via an amplifier to an on-off switching transistor. The transistor, in turn, controls the amount of electric current that is supplied through a storage/discharge device and the LED, thereby controlling the luminance of the LED.

15 Claims, 4 Drawing Sheets

METHOD AND APPARATUS FOR CONTROLLING THE DRIVE FREQUENCY OF A LED

BACKGROUND OF THE INVENTION

1. Field of the Invention

The present invention relates to a method and apparatus for controlling the drive frequency of an LED and, more particularly, for controlling the drive frequency control of an LED for a radio receiver.

2. Description of the Related Art

A radio receiver, for example, a selective calling receiver including a paging receiver, indicates an incoming call by activating a light source (LED). The drive frequency of the LED is determined so as to make the luminance of the LED be the largest. Therefore, the amount of current required becomes large and a battery life of the receiver is reduced.

Recently, an air-zinc battery having a large internal resistance has been used as a DC power source for the receiver. The air-zinc battery has a characteristic that the smaller the residual capacity, the larger the internal resistance, and an additional characteristic that the lower the ambient temperature and ambient moisture, the larger the internal resistance. Hence, it is possible for the cell voltage to fall by a large current, e.g., ten mA or more, such that the voltage of an alkaline cell or a manganese cell decreases to a voltage which is insufficient to operate the receiver.

SUMMARY OF THE INVENTION

It is therefore an object of the present invention to provide a drive frequency control method and apparatus capable of reducing the consumption current.

It is another object of the present invention to provide a drive frequency control method and apparatus capable of controlling the luminance of the LED in response to an ambient light.

According to the present invention, the inventive drive frequency control apparatus includes a light source for informing a user of an incoming call and a controller for controlling a drive frequency of the light source in response to the ambient light.

The drive frequency control apparatus according to the present invention minimizes the required electric current by changing the luminance of the LED based on the detected ambient light or illuminance.

Preferably, when the LED light is difficult to see due to the reflected light from the surroundings, the luminance of the LED is increased. In addition, it is possible, especially when there is no reflection of light, to reduce the luminance of the LED and thus to decrease the required amount of electric current.

BRIEF DESCRIPTION OF THE DRAWINGS

The above and other objects, features and advantages of this invention will become more apparent from the following detailed description taken with the accompanying drawings in which.

In the drawings, the same reference numerals denote the same structural elements.

DESCRIPTION OF THE PREFERRED EMBODIMENT

Now there will be described in detail preferred embodiments of the present invention with reference to FIGS. 1 to 5.

Figure 1:
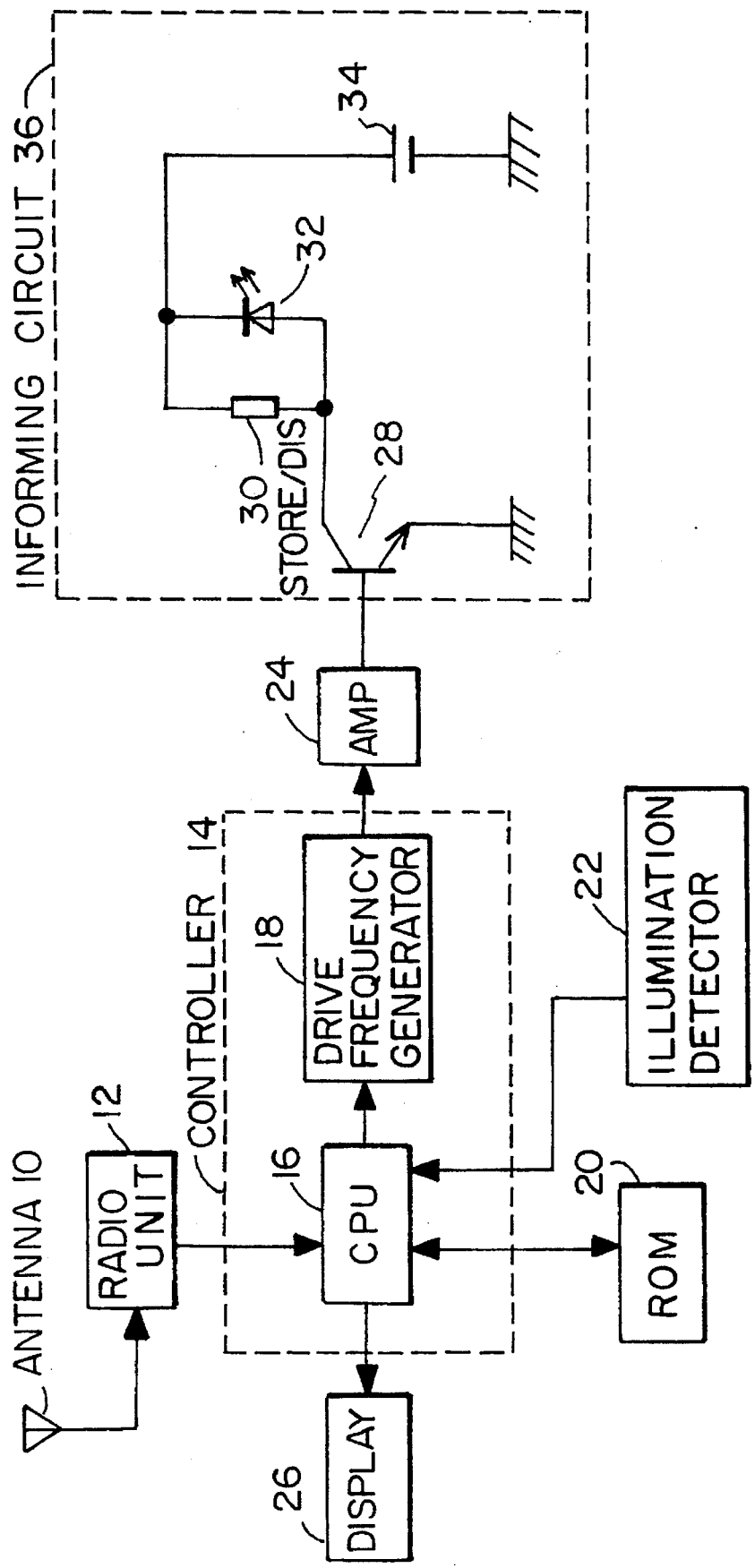
FIG. 1 is a block diagram of a preferred embodiment of a receiver according to the present invention.

FIG. 1 is a block diagram schematically illustrating a preferred embodiment of a receiver embodying the present invention. In FIG. 1, the receiver consists of an antenna 10, a radio unit 12, a controller 14, a read only memory (ROM) 20, an illumination detector 22, an amplifier 24, a display 26 and an informing circuit 36. The controller 14 consists of a central processor unit (CPU) 16 and a drive frequency generator 18. The informing circuit 36 consists of a transistor 28, a storage/discharge device (e.g., coil) 30, an LED 32 and a battery 34.

A signal received by the antenna 10 is fed to the radio unit 12 which amplifies the received signal, converts its frequency, and demodulates it to produce a baseband signal. The demodulated signal from the radio unit 12 is applied to the controller 14. The CPU 16 in the controller 14 compares identification information (ID) in the demodulated signal with a pre-assigned ID which is stored in the ROM 20. When the received ID is identical to the stored ID, the informing circuit 36 informs the user of the incoming call by activating the LED 32. A drive signal for the LED 32 is output from the CPU 16 through the drive frequency generator 18 and the amplifier 24.

The drive signal for the LED 32 is a train of rectangular pulses for repeatedly switching the transistor 28 on and off at a predetermined drive frequency. In the on-state of the transistor 28, electric current is allowed to flow from the battery 34 through the storage/discharge device 30 and a collector and an emitter of the transistor 28 to ground. In the off-state, the reverse direction voltage discharged by the storage/discharge device 30 results in electric current flowing through the LED 32 which then generates light.

Figure 2:
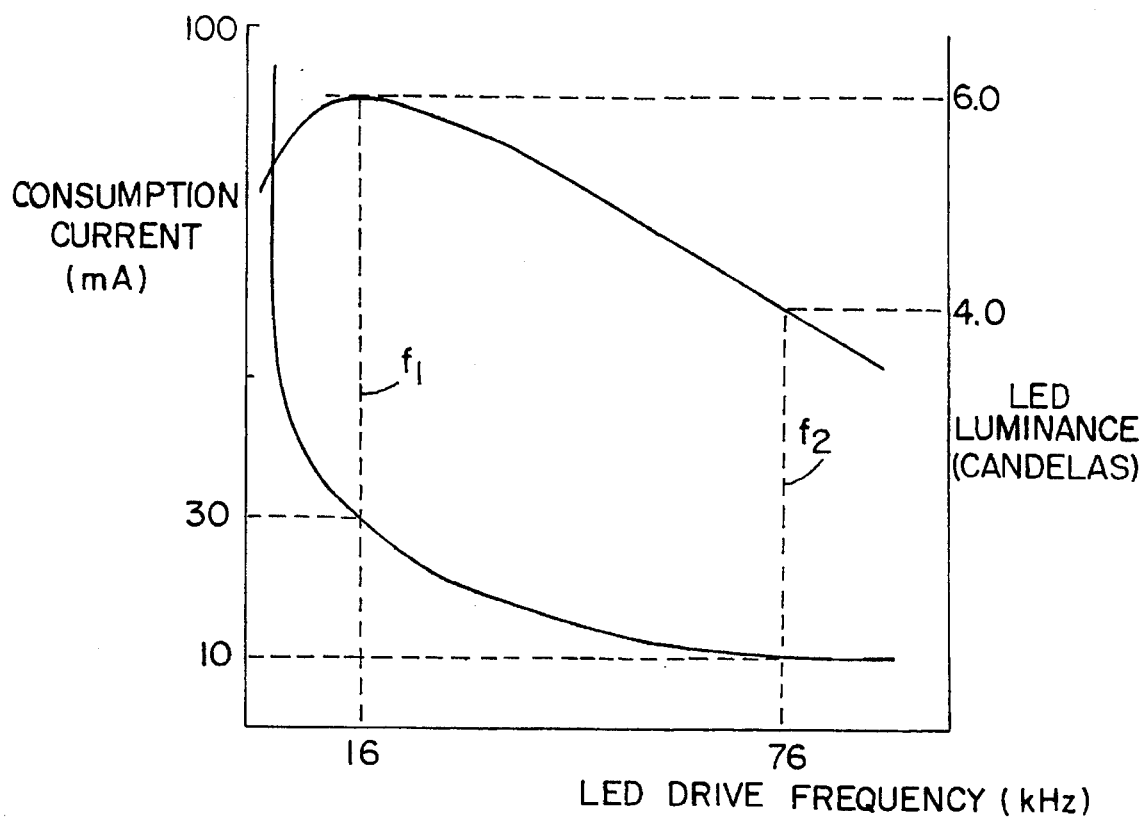
FIG. 2 is a graph showing the relationships of the consumption current and the luminance for an LED to the drive frequency.

At this point, there will be described relationships between consumption current and the drive frequency and between the luminance for the LED and the drive frequency with respect to FIG. 2.

Generally, f1 kHz at which the LED luminance is the largest, is selected as the predetermined LED drive frequency. Preferably, f1 is approximately 16 kHz. The luminance at 16 kHz is 6.0 candelas. At frequencies lower than f1 kHz, the on-state time of the transistor 28 is long, which increases the time during which electric current flows to ground, and in turn increases the consumption current. The consumption current value when current is flowing through the LED 32 in the manner stated above is the integral value of the on-state and the off-state of the transistor 28. In addition, the off-state time of the transistor 28 is long, and accordingly the integral current value flowing through the LED 32 becomes smaller, which makes the LED luminance darker than at f1 kHz.

Conversely, at a frequency near f2 kHz, e.g., 76 kHz, higher than f1 kHz, the on-state time of the transistor 28 is shorter, and hence the consumption current decreases compared to that at f1 kHz. In this case, however, a less amount reverse direction voltage is discharged by the storage/discharge 30, resulting in a lower LED luminance. For example, the luminance of 4.0 candelas is obtained at 76 kHz.

In the present invention, however, the luminance of the LED can be reduced when the ambient illuminance of the receiver is low. Hence, the drive frequency control increases the drive frequency for decreasing the luminance of the LED in response to the ambient illuminance.

Namely, the luminance of the LED must be high so as to be recognized by the user when the ambient illuminance is very light, e.g., the LED of the receiver faces in the direction of the sun. However, in other cases, the user can recognize the luminescence of the LED if the luminance of the LED is low.

The illumination detector 22, preferably a photo sensor, detects the ambient illuminance of the receiver. The illumination detector 22 may always detect the ambient illuminance or may detect the ambient illuminance in response to a signal from the CPU 16. The illumination detector 22 sends the illuminance information to the CPU 16. The CPU 16 controls the drive frequency generator 18 in response to the illuminance information. If the detected illuminance is greater than a predetermined threshold (TH) illuminance, the drive frequency generator 18 outputs a signal of f1 kHz. If the detected illuminance is equal to or smaller than the TH illuminance, the drive frequency generator 18 outputs the drive frequency f2 kHz which is higher than f1 kHz.

Figure 4:
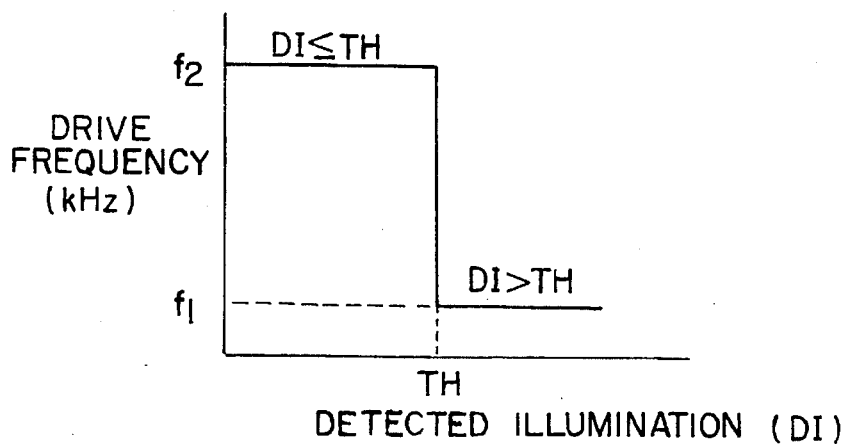
FIG. 4 is a graph showing the ambient illuminance and the LED drive frequency characteristic according to the present invention.
Figure 3:
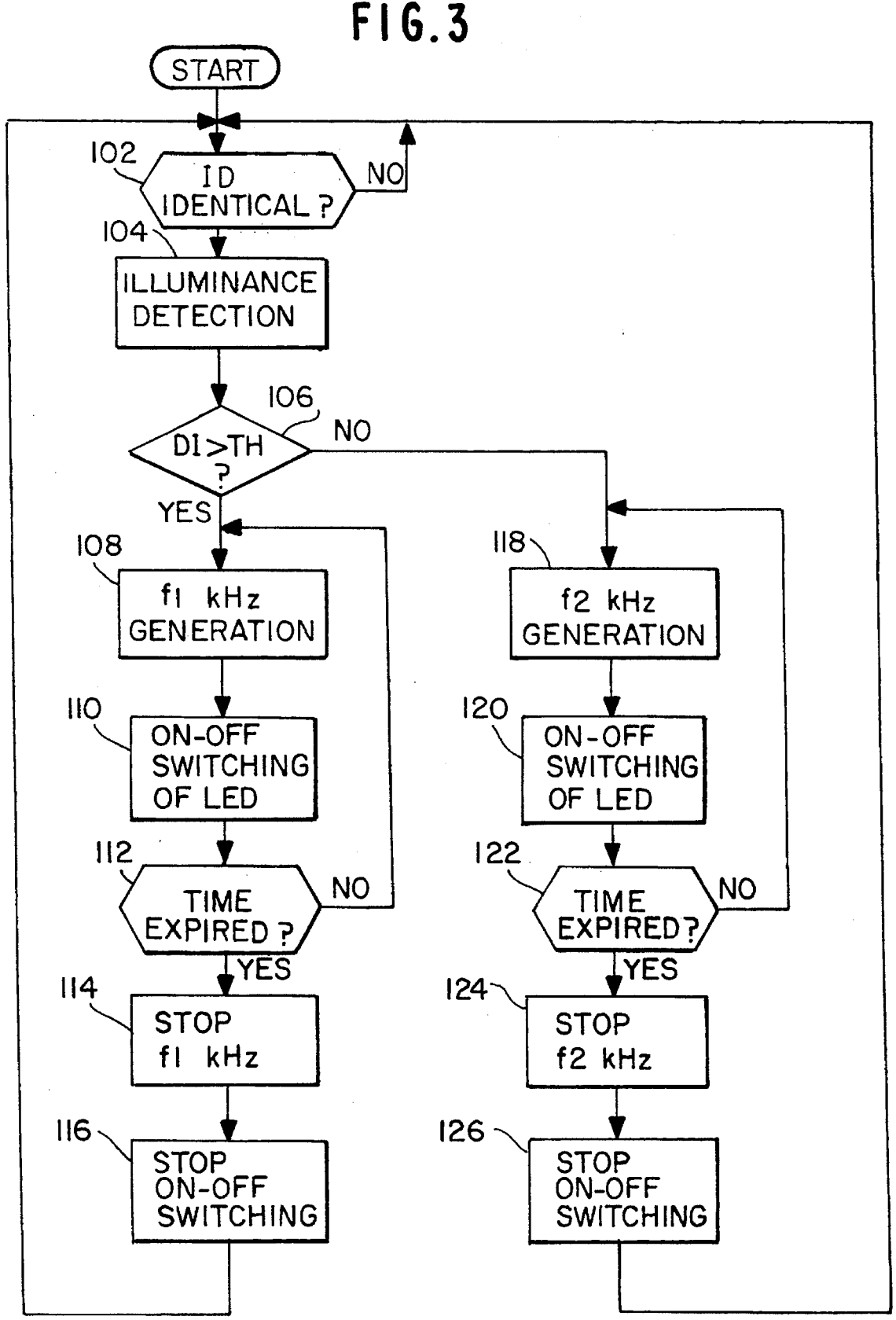
FIG. 3 is a flow chart illustrating the operation of the controller shown in FIG. 1.

Next, the operation of the controller 14 will be described in detail with reference to FIGS. 3 and 4. FIG. 3 is a flow chart illustrative of the operation, and FIG. 4 is a graph showing the ambient illuminance and the LED drive frequency characteristic.

When a received ID is identical to a pre-assigned ID in step 102 in FIG. 3, the illumination detector 22 detects the ambient illuminance in step 104. In step 106, the CPU 16 compares the detected illuminance (DI) with a predetermined threshold illuminance (TH) and judges whether or not the DI is greater than TH. If the DI is greater than TH, the CPU 16 drives the frequency generator 18 to generate a drive signal whose frequency is f1 kHz in step 108. Thereafter, the on-off switching of the LED 32 is carried out at the frequency of f1 kHz in step 110.

The drive signal generation in step 108 and on-off switching in step 110 are executed until a predetermined time passes as determined in step 112. If the predetermined time passes, the f1 kHz generation and on-off switching are stopped in steps 114 and 116, respectively.

In step 106, if the DI is equal to or less than the threshold TH, a signal of frequency f2 kHz at which the consumption current is smaller than at f1 kHz is generated by the drive frequency generator 18 in step 118. In response, the on-off switching of the LED 32 by f2 kHz is carried out until the predetermined time passes as set forth in step 122. If the time passes, the signal generation in step 118 and on-off switching in step 120 are stopped in steps 124 and 126, respectively.

In the above embodiment, one threshold value is set. However, two thresholds may be set and three drive frequencies may be used.

Figure 5:
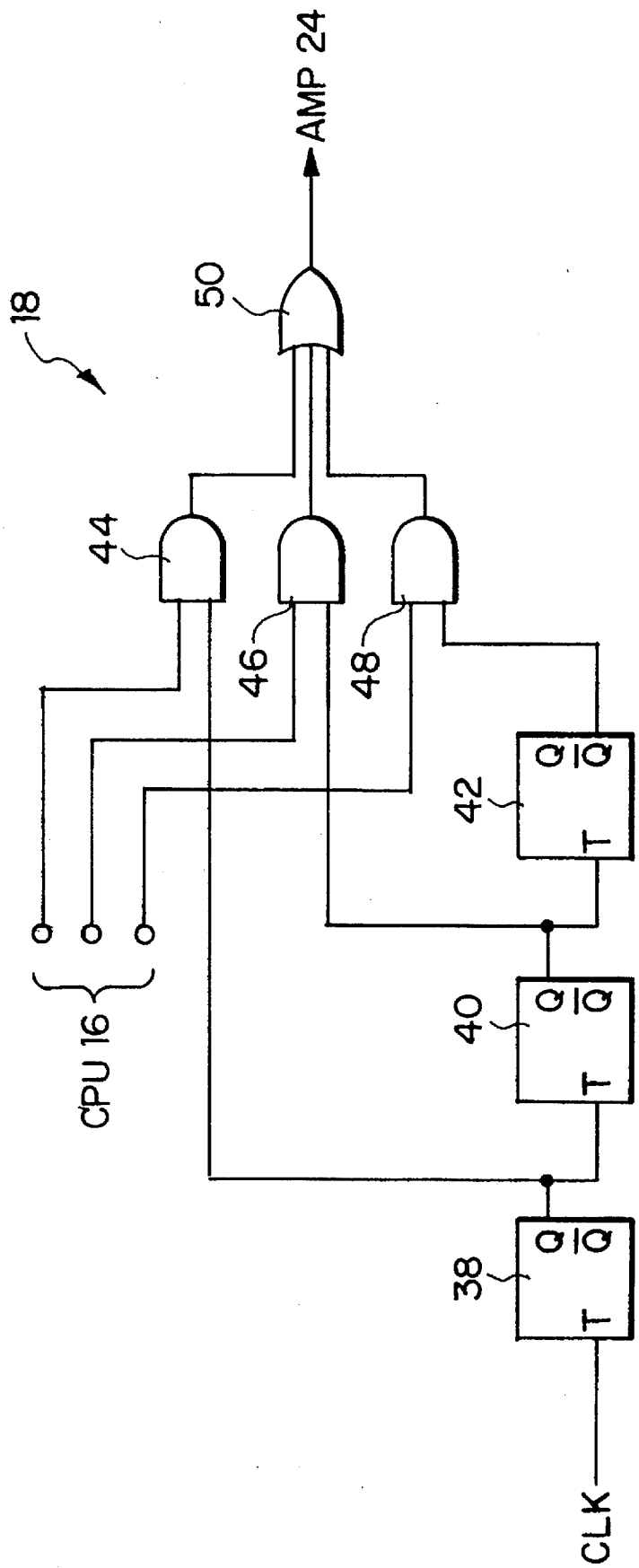
FIG. 5 is block diagram of a preferred embodiment of the drive frequency converter shown in FIG. 1.

FIG. 5 shows a preferred embodiment of the drive frequency generator 18 having three drive frequencies, m, m/2 and m/4 kHz, where m is a clock frequency. The drive frequency generator 18 consists of flip-flops 38, 40 and 42, AND gates 44, 46 and 48, and an OR gate 50.

The AND and OR gates function as a switch for selecting one frequency. The CPU 16 sends a "high" signal to one AND gate in response to the comparison between the detected ambient illuminance and the thresholds. When the detected illuminance is higher than a first threshold, the CPU 16 sends a "high" signal to the AND gate 44 and a drive signal of m kHz is supplied to the AMP 24. When the detected illuminance is between the first threshold and a second threshold, the CPU 16 sends a "high" signal to the AND gate 46 and a drive signal of m/2 kHz is supplied to the AMP 24. When the detected illuminance is lower than the second threshold, the CPU 16 applies a "high" signal to the AND gate 48 and a drive signal of m/4 kHz is supplied to the AMP 24. For example, assuming that the clock frequency is 76 kHz, signals of 76, 38 and 19 kHz are supplied.

Similarly, it is possible to execute n frequencies by using n flip-flops.

As stated above, the drive frequency control apparatus in accordance with the present invention executes control of the luminance of the LED to be large when the ambient illuminance is detected to be light as in the daytime, under a fluorescent or incandescent lamp, or in the direction of the sun, etc., and controls the illuminance of the LED to be small when the detected ambient illuminance is low as at night, in a pocket or bag, etc. When the ambient illuminance is lower than the threshold value, the drive frequency is converted to a higher frequency to decrease the luminance of the LED, and thus to reduce the consumption current.

In summary, the drive frequency control apparatus of a radio receiver of the present invention prolongs battery life by controlling the luminance of the LED based on the detected ambient illuminance of the receiver.

Although the embodiment has been described with respect to a case in which the modification was based on a specific factor, it goes without saying that the present invention is not restricted to this case.

What is claimed is:

1. A call informing device comprising:

informing means for informing a user of an incoming call; and a drive frequency controller, coupled to said informing means, for controlling a drive signal supplied to said informing means in response to ambient light of said call informing device, wherein said informing means comprises:

a light emitting element;

supplying means for supplying electric current to said light emitting element; and on-off switching means for controlling said supplying means so as to vary said electric current to said light emitting element based on said ambient light.

2. The call informing device as claimed in claim 1, wherein said drive frequency controller comprises:

a drive frequency generator for generating at least a first signal and a second signal having a first drive frequency and a second drive frequency, respectively, said second drive frequency being greater than said first drive frequency.

3. The call informing device as claimed in claim 1, wherein said drive frequency controller comprises:

a central processing unit; and a drive frequency generator, coupled to said central processing unit, for generating at least a first signal and a second signal having a first drive frequency and a second drive frequency, respectively, said second drive signal being greater than said first drive signal.

4. The call informing device as claimed in claim 1, further comprising:

an illumination detector, coupled to said drive frequency controller, for detecting a level of said ambient light.

5. The call informing device as claimed in claim 4, wherein said drive frequency controller comprises:

a drive frequency generator for generating at least a first signal and a second signal having a first drive frequency and a second drive frequency, respectively, said second drive frequency being greater than said first drive frequency.

6. The call informing device as claimed in claim 5, wherein said drive frequency controller controls said informing means by supplying said first drive signal having said first drive frequency to said informing means when a detected level of said ambient light is greater than a predetermined threshold value, and by supplying said second drive signal having said second drive frequency to said informing means when said detected level of said ambient light is less than or equal to said predetermined threshold value.

7. The call informing device as claimed in claim 1, wherein said supplying means comprises:

a storage/discharge device coupled to said light emitting element and said on-off switching means.

8. The call informing device as claimed in claim 7, wherein the luminance of said light emitting element when said second drive signal having said second drive frequency is supplied to said on-off switching means is lower than the luminance of said light emitting element when said first drive signal having said first drive frequency is supplied to said on-off switching means.

9. The call informing device as claimed in claim 7, wherein said storage/discharge device is a coil.

10. The call informing device as claimed in claim 7, wherein said drive frequency controller comprises:

a drive frequency generator for generating at least a first signal and a second signal having a first drive frequency and a second drive frequency, respectively, said second drive frequency being greater than said first drive frequency.

11. The call informing device as claimed in claim 10, wherein the luminance of said light emitting element when said second drive signal having said second drive frequency is supplied to said on-off switching means is lower than the luminance of said light emitting element when said first drive signal having said first drive frequency is supplied to said on-off switching means.

12. A pager comprising:

informing means for informing a user of an incoming call;

an illumination detector for detecting a level of ambient luminance;

a drive frequency generator for generating at least two drive signals having a first frequency and a second frequency, respectively; and a controller, coupled to said informing means and to said illumination detector, for supplying one of said at least two drive signals to said informing means in response to a detected level of said ambient luminance, wherein said informing means comprises:

a light emitting element;

supplying means for supplying electric current to said light emitting element; and on-off switching means for controlling said supplying means to supply said one of said at least two drive signals to said light emitting element.

13. The pager as claimed in claim 12, wherein said supplying means comprises:

a storage/discharge device coupled to said light emitting element and said on-off switching means.

14. The pager as claimed in claim 13, wherein said storage/discharge device is a coil.

15. A method for controlling the drive frequency of a drive signal supplied to a call informing device, said method comprising the steps of:

detecting a level of ambient light;

comparing said detected level of ambient light with a predetermined threshold value;

generating a drive signal having a frequency determined by the result of said comparing step; and informing a user of an incoming call by supplying said drive signal to said call informing device.

* * * * *